United States Patent [19]
Bogue et al.

[11] 3,767,933
[45] Oct. 23, 1973

[54] POWER SUPPLY HAVING A PLURALITY OF POWER SOURCES THAT ARE SEQUENTIALLY PLACED ON LOAD ONE AT A TIME

[75] Inventors: John C. Bogue, 101 Ocean Ave.; Robert I. Sarbacher, 1045 Ocean Ave., Suite 1, both of Santa Monica, Calif. 90403

[73] Assignee: Bogue by said Sarbacher

[22] Filed: May 30, 1972

[21] Appl. No.: 257,535

[52] U.S. Cl. .................................. 307/48, 307/66
[51] Int. Cl. ............................................ H02j 3/32
[58] Field of Search ..................... 307/48, 65, 66; 320/13

[56] References Cited
UNITED STATES PATENTS
3,356,857   12/1967   Strasen et al. ................ 307/48 X
3,639,773   2/1972   Ayd et al. ........................ 307/66

*Primary Examiner*—William M. Shoop, Jr.
*Attorney*—Anthony T. Lane et al.

[57] ABSTRACT

An electrical power, supply, particularly adapted for intermittent use, that has an extremely long standby life is disclosed. The power supply includes a series of batteries that are selectively placed in the load circuit. A new battery is placed in the load circuit when the battery previously supplying power to the load is substantially exhausted. Three different circuits are disclosed for sequentially placing the batteries in the load circuit. All three circuits are particularly adapted for use with electrochemical batteries that are activated by a squib or the like. Thus, the circuits not only place a new battery in the load circuit when the preceding battery has substantially spent its useful life but also provides for the activation of the new battery as it is placed in the load circuit. In addition, one of the circuits can be used with conventional activated batteries as well as the reserve type batteries that have to be activated.

22 Claims, 4 Drawing Figures

3,767,933

3,767,933

POWER SUPPLY HAVING A PLURALITY OF POWER SOURCES THAT ARE SEQUENTIALLY PLACED ON LOAD ONE AT A TIME

BACKGROUND OF THE INVENTION

This invention relates to power supplies, and more particularly, to a power supply having an extremely long standby life.

There are a number of instances where a standby source of electrical power is needed, so that power is available when required, but where the total power required over a long period of time is not great. Installations requiring such power are sometimes remote and not reasonably accessible. One such installation is an underwater transponder sonobuoy system utilized for navigational guidance purposes. The only practical method of powering the circuitry of these sonobuoys is by electrochemical batteries, and a significant limiting factor in the useful life of these devices is therefore the shelf and/or standby life of the battery power supply. Of course, battery power supplies having a long standby life can be used advantageously in any system using batteries as a source of electrical power.

Power supplies having an extremely long standby life are disclosed in the following copending applications:

Ser. No. 879,158, filed Nov. 24, 1969; now U.S. Pat. No. 3,666,961

Ser. No. 884,783, filed Dec. 15, 1969; now U.S. Pat. No. 3,666,962 and

Ser. No. 53,097, filed July 8, 1970 now U.S. Pat. No. 3,693,068.

These copending applications disclose power supplies using a series of reserve batteries and selective activation circuits. In said U.S. Pat. Nos. 3,666,962 and 3,693,068, relays are used in the selective activation circuitry. The batteries are activated as they are selectively placed in the load circuit by means of a squib or the like. In addition, said U.S. Pat. No. 3,693,068 discloses a mechanical linkage arrangement that can be used to activate a new battery as it is placed in the load circuit. In said U.S. Pat. No. 3,666,961, the selective activation circuitry utilizes battery voltage responsive circuitry and a stepping switch. In the power supplies described in all three said copending applications, a new battery is not activated and placed in the load circuit until the battery previously supplying power to the load has substantially exhausted its useful life.

This application is directed to power supplies of the type disclosed in the three said copending applications. However, instead of relays and stepping switches, the selective activation circuits disclosed in this application utilize electronic circuits and do not use relays or stepping switches. In addition one of the circuits disclosed can be used with conventional active batteries as well as with the reserve type batteries.

While the relay and stepping switch circuits of said copending applications operate very satisfactorily, the electronic circuits of this invention avoid the typical malfunctions or failures, such as mechanical malfunctions or failures that can occur when relays or stepping switches are used. In addition, an environment such as a dusty or dirty environment could cause malfunction of relays or stepping switches; whereas, the electronic circuits of this invention would generally be immune to such dust or dirt. In other words, while the power supplies of said copending applications operate in a highly satisfactory manner, the power supplies of this invention provide some definite advantages, particularly in some specific applications.

SUMMARY OF THE INVENTION

Three power supplies constructed in accordance with this invention are disclosed. Two of the power supplies use reserve batteries, while the third can use either reserve batteries or conventional active batteries.

Reserve primary cell batteries and dry charged secondary batteries are known in the art. In such batteries, the electrodes are fully assembled for operation, but the electrolyte is held in reserve in a separate container which may be within the battery container. Since there is no consumption of the electrodes under these circumstances, the shelf life of the battery is essentially indefinite. However, once the electrolyte is released from its reserve container, such as by mechanical puncture, explosive squib rupture or by any other means as are well known in the art, the battery is activated and thereafter has a limited standby life.

In accordance with the reserve battery embodiments of this invention, a series of reserve primary cell batteries or dry charged secondary batteries are employed in combination with one of the three disclosed selective activation circuits. When all of the batteries of the system are in the reserve status, the power supply shelf life is practically indefinite. However, once the first battery is activated, the standby life of the system is limited; but because of the selective or controlled sequential activation of the series of batteries, an extremely long standby life is obtained.

The first battery to be activated is activated by a mechanical plunger of by any other suitable means. The selective activation circuits of this invention monitor the voltage of this battery and when the voltage drops below a certain level, indicating that this battery is practically exhausted, the circuits automatically activate the next battery in the series. As the voltage of this battery drops below the given value, the next battery is activated and so on until the last battery of the series has been activated. Thus, the batteries of the power supply are sequentially activated one at a time as the immediately preceeding activated battery reaches the end of its useful life.

The one of the three disclosed selection circuits that can also be used with power supplies having conventional active batteries, monitors the voltage of the battery supplying power to the load the voltage places a new battery in the load circuit when the voltage of the battery supplying power to the load nears the end of its useful life, as indicated by a drop in voltage below a given value. Thus, the circuit sequentially places the batteries in the load circuit, one at a time, as the immediately preceeding battery that was placed in the load circuit becomes exhausted. Of course, no activation circuitry or apparatus is required since the batteries in this case are active batteries. When this circuit is used with reserve batteries, activation circuitry or apparatus is, of course, included.

BRIEF DESCRIPTION OF THE DRAWING

A complete understanding of the invention can be obtained from the following detailed description when read in conjunction with the annexed drawing in which.

DESCRIPTION OF THE INVENTION

Figure 1:
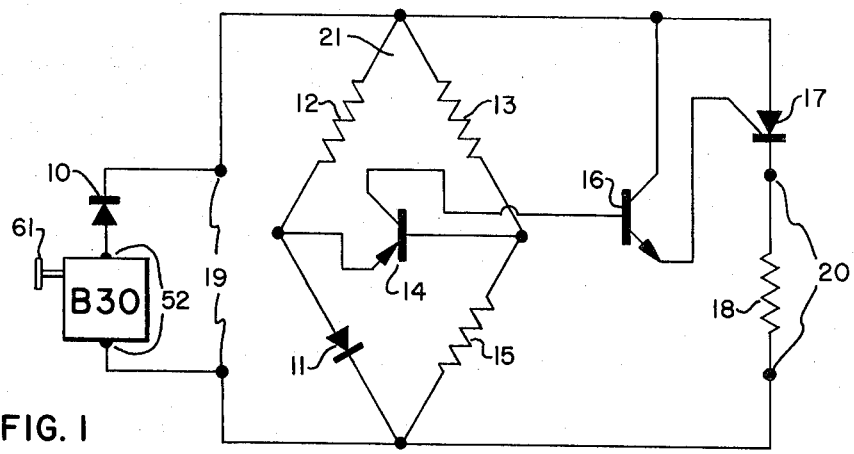
FIG. 1 is a schematic diagram of a first embodiment of the selective activation circuitry of this invention.

Referring to FIG. 1, this Figure shows a selective activation circuit constructed in accordance with this invention. As will be apparent, this circuitry monitors the voltage of a reserve battery and activates another battery when the voltage of the battery being monitored falls below a given value.

As shown in the Figure, the terminals 52 of the battery B30 are connected to the terminals 19 of the bridge circuit 21. One battery terminal 52 is connected directly to one of the terminals 19 and the other battery terminal 52 is connected to the other terminal 19 through the diode 10, as indicated.

Bridge circuit 21 is made up of four arms consisting of the diode 11 and the three resistors 12, 13 and 15. The emitter and base of the transistor 14 are connected across bridge 21. The collector of transistor 14 is connected to the base of the transistor 16. The collector of transistor 16 is connected to one of the terminals 19 and the emitter of this transistor is connected to the gate electrode of the silicon controlled rectifier (SCR) 17. The anode of SCR 17 is connected to one of the terminals 19 and its cathode is connected to one of the two terminals 20. The other terminal 20 is connected to one of the terminals 19. An electrically fired squib 18, represented as a resistor in the drawing, is connected across the terminals 20.

Battery B30 is a reserve type battery that remains inactive until activated. Battery B30 may be activated mechanically or manually as suggested by the plunger 61. Of course, battery B30 may be activated by any known means. In any event, as illustrated, battery B30 is activated by depressing plunger 61 which ruptures the electrolyte container thereby permitting the electrolyte to flow into and actuate the battery. When battery B30 is activated, a voltage is applied thorugh terminals 19 to the arms of bridge circuit 21. This voltage is also applied to SCR 17 in series with squib 18. However, no current flows through squib 18 because SCR 17 is non-conducting since no gate voltage is present at this time on its gate electrode. An SCR remains off eventhough a proper voltage is applied to its anode and cathode until it is gated on by its gate electrode.

The value of resistors 312, 313 and 315 and the characteristics of the diode 311 are so chosen that the potential of the base of transistor 14 is positive with respect to its emitter as long as the voltage of battery B30 remains above a certain value. Thus, when battery B30 is first activated and until the battery is essentially exhausted, transistor 14 remains non-conductive. When the voltage of battery B30 drops below a given value indicating that battery B30 has essentially ended its useful life, the potential of the base of transistor 14 becomes negative with respect to its emitter and transistor 14 conducts. Since the collector of transistor 14 is connected to the base of transistor 16, transistor 16 will be rendered conductive when transistor 14 is conducting. When transistor 16 is conducting, a gate voltage is applied to the gate of SCR 17, thereby turning on SCR 17 which then permits a surge of current to flow through squib 17. This current is sufficient to fire the squib which is associated with a second reserve battery. Firing of this squib activates this second battery.

Figure 2:
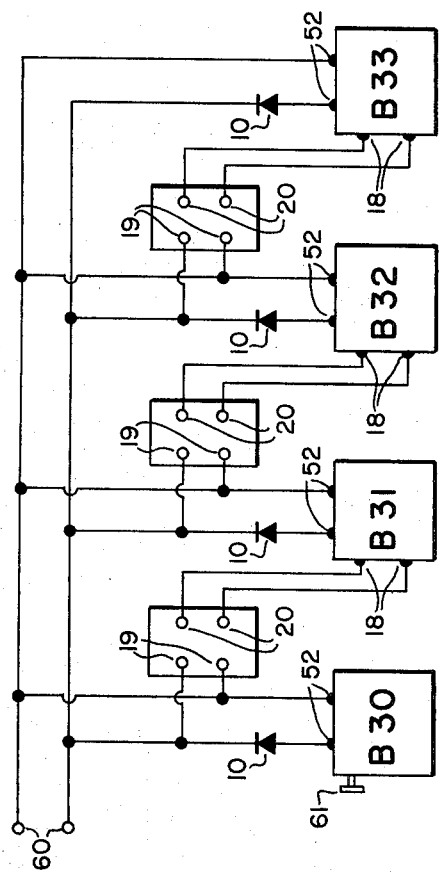
FIG. 2 shows a sequential power supply system using the circuitry of FIG. 1.

FIG. 2 shows the circuitry of FIG. 1 connected into a sequential power supply system having a series of batteries B30 and B33. Three circuits identical to the circuit of FIG. 1 are utilized as shown. The number of these circuits used is always one less than the number of batteries used since the first battery to be activated is activated manually or by any other suitable means. The terminals 52 of each of the batter-ies B30 through B32 are connected to the output terminals 60 and to the terminals 19 of their respective bridge circuit. The battery terminals of battery B33 are connected to output terminals 60 only since this is the last battery that will be activated and therefore no voltage monitoring and activation circuitry is associated with this battery. Each of the batteries B31 through B33 includes a squib 18 which is connected across the terminals 20 of its associated activation circuitry.

As before, battery B30 is activated by depressing plunger 61. When battery B30 is activated it will provide a voltage to output or load terminals 60 and provides a voltage across terminals 19. During the initial build up of voltage after battery B30 is activated, transistor 14 will not conduct due to the presence of diode 10. As long as the voltage of battery B30 remains above a certain value, which is determined by the elements of the bridge circuit of for that matter a potentiometer or the like (not shown) could also be used to adjust the useful voltage level to meet any particular load requirements, the transistor connected across the bridge (transistor 14, FIG. 1) will remain off. When the voltage falls below this value, the SCR of the activation circuitry will be turned on and battery B31 will be activated by its squib 18. Battery B31 will then provide the voltage to output or load terminals 60. Battery B31 will continue to supply this voltage until its useful life is ended and then battery B32 will provide this voltage and then finally battery B33. Of course, more or less than four batteries could be provided.

The fact that all the batteries are connected to the output terminals at all times has no ill effect on the system. Before the batteries are activated their internal impedance is extremely high, and therefore the inactive batteries have no adverse effect on the system. After a battery has been activated it will until it is too far exhausted continue to supply a voltage to terminals 60 even after the next battery is activated. However, this has no adverse effect on the system. Further, the diodes 10 are so poled that an exhausted battery will not draw voltage from the fresh battery.

From the foregoing discussion, it is apparent that the circuitry of FIG. 2 provides a power supply that has an extremely long shelf and/or long standby life. The batteries are activated sequentially one at a time as needed. Until a battery is activated, its shelf life is essentially unlimited.

Figure 3:
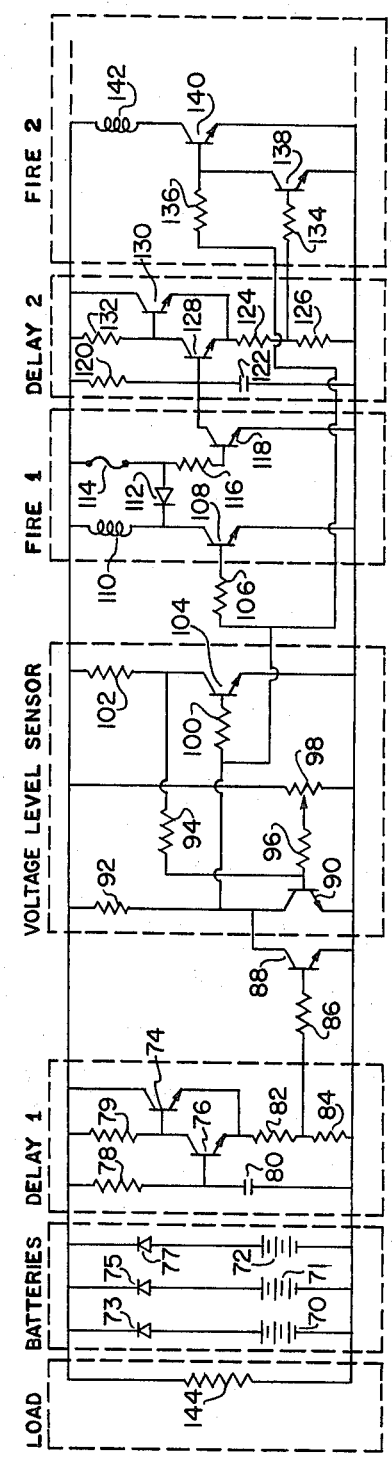
FIG. 3 is a schematic diagram of a sequential power supply system and a second embodiment of the selective activation circuitry of this invention.

FIG. 3 shows a second embodiment of the invention. As shown in this Figure, the power supply contains the three reserve batteries 70, 71 and 72. The diodes 73, 75 and 77 are connected in series with the batteries 70, 71 and 72, respectively. Each series combination of diode and battery is connected across the load 144. A delay 1 circuit, a battery voltage level sensing circuit, a fire 1 circuit, a delay 2 circuit, and a fire 2 circuit are also all connected across the reserve batteries 70 through 71.

The delay 1 circuit includes a pair of transistors 74 and 76. Transistor 74 has its collector connected to the cathodes of diodes 73, 75 and 77 and its emitter connected to the emitter of transistor 76. The base of transistor 74 is connected to the collector of transistor 76, which is coupled to the cathodes of diodes 73, 75 and 77 through the resistor 79. The emitter of transistor 76 is coupled to the negative side of batteries 70 through 72 through the serially connected resistors 82 and 84. A resistor 78 is connected between the base of transistor 76 and the cathodes of diodes 73, 75 and 77. A capacitor 80 in series with resistor 78 is connected between the base of transistor 76 and the negative side of batteries 70 through 72.

Delay circuit 2 which includes the transistors 128 and 130 and the associated resistors 120, 124, 126 and 132 and the capacitor 122 is identical to the delay 1 circuit and is connected in the circuit in an identical manner, except that the base of transistor 128 which is equivalent to transistor 76 of the delay 1 circuit is also connected to the collector of the transistor 118 of the fire 1 circuit. There is no equivalent connection to the base of transistor 76.

The voltage level sensing circuitry includes the transistors 88, 90 and 104. The collectors of transistors 88 and 90 are coupled to the cathodes 73, 75 and 77 through the resistor 92 and the emitters of these transistors are connected directly to the negative side of batteries 70 through 72. The base of transistor 88 is coupled to the common point of resistors 82 and 84 through the resistor 86 and the base of transistor 90 is coupled to the movable arm of potentiometer 98 through the resistor 96. A resistor 94 is connected between the base of transistor 90 and the collector of transistor 104 and a resistor 102 is connected between the cathodes of diodes 73, 75 and 77 and the collector of this transistor. The base of transistor 102 is coupled to the collectors of transistors 88 and 90 through the resistor 100 and its emitter is connected to the negative side of batteries 70 through 72.

The collectors of transistors 88 and 90 are also coupled to the base of the transistor 88 of the fire 1 circuit through the resistor 106 and to the base of the transistor 140 of the fire 2 circuit through resistor 136.

Fire 1 circuit in addition to transistor 108 includes the transistor 118. The collector of transistor 108 is connected to the cathodes of diodes 73, 75 and 77 through an electronically fired squib 110 and the emitter of this transistor is connected to the negative side of batteries 70 through 72 as is the emitter of transistor 118. As mentioned, the collector of transistor 118 is connected to the base of transistor 128 of the delay 2 circuit. A fuse 114 and a resistor 116 are connected in series between the base of transistor 118 and the cathodes of diodes 73, 75 and 77. A diode 112 is connected between the common point of fuse 114 and resistor 116.

The fire 2 circuit contains the transistor 140 at the squib 142 which are equivalent to transistor 108 and squib 110 of the fire 1 circuit. In addition, the fire 2 circuit contains transistor 138, an equivalent of which is not found in the fire 1 circuit. The collector of transistor 138 is connected to the base of transistor 140 and its emitter is connected to the negative side of batteries 70-72. The base of this transistor is connected to the common point of serially connected resistors 124 and 126.

If a fourth battery is used, a transistor, fuse and associated circuitry equivalent transistor 118, fuse 114 and associated circuitry would be added to the fire 2 circuit. If still more batteries were added, circuits equivalent to the fire 1 circuit with the additional transistor (transistor 138) of the fire 2 circuit would be added. The fire circuit for the last battery would, however, be identical to the fire 2 circuit, the fire 2 circuit in FIG. 3 being the fire circuit for the last battery in the power supply of FIG. 3.

As was the case in FIG. 2, the first battery to be activated is manually activated as, for example, by a plunger. Assume battery 70 is the first battery activated, when this battery is activated, transistor 74 of delay circuit 1 conducts immediately as does transistor 88 of the voltage level sensor. Transistor 76 will, however, remain non-conducting until a sufficient charge has been built up on capacitor 80. This gives battery 70 sufficient time to build up its voltage after it is first activated.

When the charge on capacitor 80 has risen to a sufficient value, transistor 76 will conduct and transistors 74 and 88 will be rendered non-conductive. Since battery 70 has now come up to or near its full voltage, transistor 90 will conduct. At this point no further changes take place in the circuit.

Note that when battery 70 is first activated, transistor 130 of delay 2 will also be rendered conductive and transistor 138 will also be conducting. Transistor 128 will not, however, conduct because it is inhibited by transistor 118 of the fire 1 circuit. Thus transistor 138 will not be turned off when battery 70 comes up to full voltage.

All circuits are now operating as described and will continue to operate in this manner until the voltage of battery 70 drops to a vlaue where transistor 90 will no longer conduct. When transistor 90 turns off, a voltage pulse appears on its collector. Transistor 104 operates as a pulse shaping circuit to shape this pulse. This pulse is applied to the base of transistor 108 and renders this transistor conductive. Transistor 140 of fire 2 is not rendered conductive because transistor 138 is conducting. When transistor 108 conducts, squib 110 fires to render the next battery active. Assume squib 110 is part of or associated with battery 71, then this battery will be activated. When squib 110 fires, it blows fuse 114 and in effect removes transistor 118 from the circuit. Thus, transistor 128 of the delay 2 circuit will conduct when the charge on capacitor 122 reaches a sufficient level during the voltage build of battery 71, since transistor 118 can no longer inhibit transistor 128. When transistor 128 conducts, transistors 130 and 138 are rendered non-conductive. During the same time, delay 1 operates in the same manner as it did when battery 70 was activated and therefore, controls the voltage level sensing circuitry as it did when battery 70 was activated. That is, transistor 88 will be cut-off and transistor 90 will conduct when the voltage of battery 71 nears or reaches its full value.

When the voltage of battery 71 drops below the level at which transistor 90 will conduct, a pulse shaped by transistor 104 will again appear on the collector of transistor 90. This pulse will have no effect on the fire 1 circuit since squib 110 has already been fired, but this pulse will render transistor 140 conductive since transistor 138 is now non-conductive. When transistor 140 conducts, it fires squib 142 to activate its associated battery which in this case must be battery 72.

If any other batteries are provided, other delay and fire circuits will be as mentioned above and the operation as should be apparent will be as described above for the circuits shown in FIG. 3. All additional firing circuits must, of course, have a transistor equivalent to transistor 138 of fire 2 to assure that the batteries will be fired in the proper sequence. These transistors inhibit the firing of their associated squib until the use in the immediately preceding firing circuit has been blown out. It should also be noted that the diodes 73, 75 and 77 prevent current drain of a fresh battery by an exhausted battery.

Figure 4:
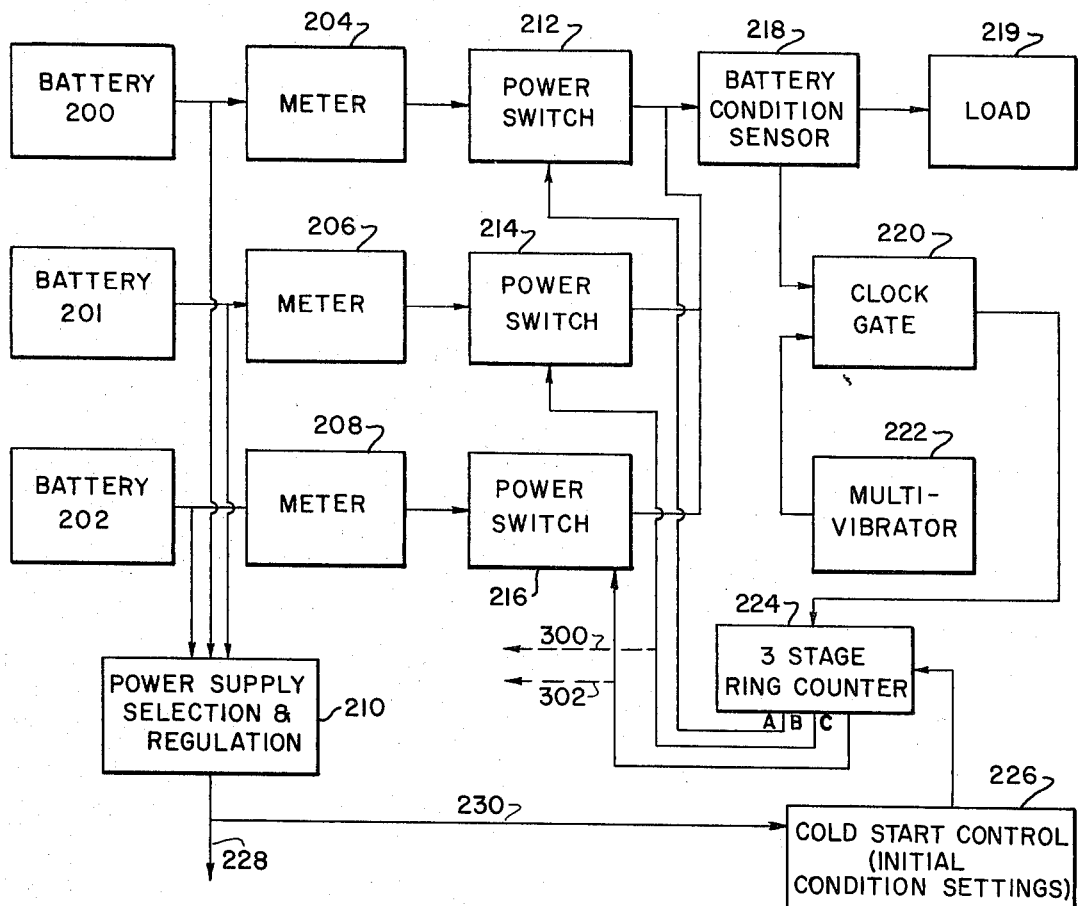
FIG. 4 is a block diagram showing an embodiment of this invention that can use either reserve batteries or activated batteries.

FIG. 4 shows the embodiment of the invention that can be used with reserve batteries or conventional batteries. As shown the batteries 200, 201 and 202 are conventional active batteries. The batteries 200 through 202 are all connected to the power supply selection and regulation circuit 210 which supplies and regulates the power to the remaining circuits, as indicated by the lines 228 and 230. Lines 228 and 230 are merely power supply lines. Battery 200 is coupled to the load 220 through the meter 204, the power switch 212 and battery sensor 218. Similarly, battery 201 is coupled to load 220 through the meter 206, the power switch 214 and sensor 218 and battery 202 is coupled to load 220 through the meter 208, the power switch 216 and battery sensor 218. Power switches are electrically controlled switches and are controlled by the three stage ring counter 224. Ring counter 224 has the three outputs A, B and C which are connected to power switches 212 through 216, respectively. Ring counter 224 is controlled by the output of the clock gate 220. Clock gate 220 has two inputs; one connected to sensor 218 and the other connected to the output of multivibrator 222. The cold start circuit 226 is, as will be apparent later, used to control the initial starting up of the power supply. All the circuits are shown in block diagram form because all the circuits are available on the market.

Assuming that battery 200 is to be the first battery applied to the load, then control circuit 226 will be set to cause ring counter 224 to provide a signal on output A to close switch 212 thereby coupling battery 200 to load 219. Power switches 214 and 216 remain open. When the voltage of battery 200 falls below a given value, battery sensor 218 provides a signal to clock gate 220 to open this gate and allow the output of multivibrator 222 to pass to ring counter 224. An output signal will now appear on output B of ring counter 224 and close switch 214 to couple battery 201 to the load. When battery 201 nears the end of its useful life, sensor 218 will signal gate 220 which in turn will allow the output of multivibrator 222 to pass to ring counter 224. An output signal now appears on output C of ring counter 224 and switch 208 will close to couple battery 202 to load 219. It should be noted that as switch 214 is closed, switch 212 is opened and as switch 215 is closed switch 214 is opened with switch 212 remaining open.

As many additional batteries as desired may be added to the power supply. Of course, the number of stages of ring counter 224 will have to be increased accordingly. It is also noted that meters 204, 206 and 208 merely give a visual indication of current being drawn from batteries 200, 201 and 202 respectively are coupled to load 219 and can therefore be eliminated. In addition if any one of the batteries should be faulty, the next switch in line will be closed when the battery voltage of the faulty battery is not sufficient to inhibit an output from sensor 218.

In this respect it should be noted that in the circuit of FIG. 3, the next battery in sequence will be activated if the voltage of the newly activated battery fails to come up to a sufficient value to cause the transistor 90 of the voltage level sensing circuit to again conduct. This is true in most cases even if the next battery activated has been destroyed because the previously activated battery will generally still have sufficient voltage to fire the next squib. In the case of the FIG. 2 power supply, the next battery in sequence will not be activated if the battery that is just activated does not provide any output voltage whatsoever; this, however, would be very unusual and would occur very rarely.

While the circuitry of FIG. 4 has been described as being used with conventional active batteries, it can also be used with reserve type batteries. If batteries 200 through 202 are reserve batteries, the first battery to be coupled to the load which has been assembled to be battery 200 is manually activated as by the plunger 61 of battery B30 of FIGS. 1 and 2. This battery will then supply power to the control circuits by means of power supply section 210 and cold start control 226 will be set to control ring counter 224 such that switch 212 will be closed first to thereby couple battery 200 to load 219. When the voltage of battery 200 falls below a given value, sensor 218 will operate as described above to close switch 214. However, the battery 201 is now a reserve battery and must be activated. The output signal that appears on output B of ring counter 224 can be used to close switch 214 and fire a squib to activate battery 201. This squib connection is indicated by the dotted line 300 connected to output B of ring counter 224. The dotted line 302 connected to output C of ring counter 224 indicates the squib connection to battery 202. This squib will of course be fired and switch 216 will be closed when the voltage of battery 201 falls below a given level; the operation being the same as described above for battery 201 when the battery 200 approached the end of its useful life. Thus, it is apparent that the circuit of FIG. 4 operates in the same manner when either reserve or active batteries are used. However, the operation of sensor 218, clock gate 220, multivibrator 222 and ring counter 224 must be such that ring counter 224 is not switched to its next stage before a reserve battery comes up to full voltage. In the case of the active batteries, this precaution is not necessary since these batteries are at full potential when coupled to the load. Thus, circuits having different time functions could be used for the active batteries and the reserve batteries. Circuits of the type illustrated by the blocks in FIG. 4 that have different time functions are well known and are available on the market. While it has not been specifically mentioned, it should be obvious that more than three reserve batteries can also be provided in the power supply of FIG. 4 as is the case with the active batteries. It should also be obvious that while the batteries 200 through 202 will have a sufficient voltage level to operate the circuits, even when their voltage level drops to the point where a fresh battery is coupled to the load 219, a separate battery power supply to insure proper operation can be provided for power supply 210 and thus the rest of the circuits. This additional battery power supply can be provided with both the active battery and reserve battery embodiments of the invention and can be used separately or in conjunction with batteries 200 through 202 to power the various circuits.

While the invention has been described with reference to specific embodiments, it will be obvious to those skilled in the art that various changes and modifications can be made to the embodiments disclosed without departing from the spirit and scope of the invention as set forth in the appended claims.

What is claimed is:

1. A power supply comprising:
   output terminals;
   a plurality of batteries, the output voltage of only one of said plurality of batteries being initially applied to said output terminals;
   voltage level responsive means coupled to each of said plurality of batteries;
   first means coupled to the output of said voltage level responsive means for applying the output voltage of a second battery of said plurality of batteries to said output terminals when said output voltage of said initially applied battery drops to a given value, said voltage level responsive means providing an output signal when said output voltage of said initially applied battery drops to said given value and said first means responding to said output signal from said voltage level responsive means to couple said output voltage of said second battery to said output terminals;and
   additional separate means associated with each one of said plurality of batteries, except said battery whose output voltage is initially applied to said output terminals and said second battery which is associated with said first means, for sequentially applying the output voltage of each battery, one at a time, except said battery whose output voltage is initially applied to said output terminals and the output voltage of said second battery, to said output terminals as the output voltage of the just previously applied battery drops to said given value, said voltage level responsive means providing an output signal to activate said additional separate means, one at a time, each time the output voltage of the just previously applied battery drops to said given value.

2. The power supply as defined in claim 1 wherein said plurality of batteries are reserve type batteries.

3. The power supply as defined in claim 1 wherein said batteries are active batteries.

4. The power supply as defined in claim 2 wherein said voltage level responsive means are separate bridge circuits one for each battery of said plurality of batteries except for one and wherein said means responsive to said voltage level responsive means are a plurality of silicon controlled rectifiers one less in number than said plurality of batteries.

5. The power supply as defined in claim 2 wherein said voltage level responsive means is a voltage level sensor and said means responsive to said voltage level responsive means are a plurality of transistorized firing circuits one less in number than the number of said plurality of batteries.

6. The power supply as defined in claim 1 wherein said voltage level responsive means is a voltage sensor and said means responsive to said voltage level responsive means are a plurality of power switches equal in number to the number of said plurality of batteries.

7. The power supply as defined in claim 2 wherein said voltage level responsive means is a voltage sensor and said means responsive to said voltage level responsive means are a plurality of power switches equal in number to the number of said plurality of batteries.

8. The power supply as defined in claim 4 wherein each of said bridge circuits comprises:
   a first arm having a resistor, a second arm having a resistor, a third arm having a resistor and a fourth arm having a diode; and
   a transistor having its base connected to the common point of said second and third arms and its emitter connected to the common point of said first and fourth arms.

9. A power supply as defined in claim 8 wherein each of said silicon controlled rectifiers has a cathode electrode, an anode electrode and a gate electrode and wherein each of said bridge circuits is coupled to a different one of said silicon controlled rectifiers through a separate transistor, each of said separate transistors having its emitter connected to a gate electrode of its associated silicon controlled rectifier, its collector connected to the anode electrode of the associated silicon controlled rectifier and its base electrode connected to the collector electrode of said transistor connected in the associated bridge circuit.

10. A power supply as defined in claim 9 wherein the battery associated with each bridge circuit has one terminal connected to the common point of said third and fourth arms of its associated bridge circuit and its second terminal coupled to said first and second arms of its associated bridge circuit through a diode.

11. A power supply circuit as defined in claim 10 wherein a separate squib is connected between the cathode electrode of each silicon controlled rectifier and the common point of said third and fourth arms of the bridge circuit asso-ciated with the silicon controlled rectifier, said squib being energized to actuate the next battery whose output voltage is to be applied to said output terminals when the output voltage of the battery whose output was just previously applied to said output terminals reaches said given value.

12. A power supply as defined in claim 3 wherein said voltage level responsive means includes a battery condition sensor, said means responsive to said voltage level responsive means are a plurality of power switches equal in number to the number of said plurality of batteries.

13. A power supply as defined in claim 12 including a clock gate having a first input, a second input and an output; means to connect said first input of said clock gate to said battery condition sensor; a multivibrator having an output connected to said second input of said clock gate; a ring counter having stages equal in number to the number of said plurality of batteries, at least one input and a plurality of outputs equal in number to the number of said stages; means to connect said input of said ring counter to said output of said clock gate; and means to connect each one of said ring counter outputs to a different one of said power switches.

14. A power supply as defined in claim 13 wherein said ring counter is provided with a second input and wherein a cold start circuit is connected to said second input of said ring counter to apply said initial battery output voltage to said output terminals.

15. A power supply as defined in claim 2 wherein means are provided to sequentially activate each of said plurality of batteries, one at a time, when the output voltage of that battery is to be applied to said output terminals.

16. A power supply as defined in claim 15 wherein said voltage level responsive means includes a battery condition sensor, said means responsive to said voltage level responsive means are a plurality of power switches equal in number to the number of said plurality of batteries.

17. A power supply as defined in claim 16 including a clock gate having a first input, a second input and an output; means to connect said first input of said clock gate to said battery condition sensor; a multivibrator having an output connected to said second input of said clock gate; a ring counter having stages equal in number to the number of said plurality of batteries, at least one input and a plurality of outputs equal in number to the number of said stages; means to connect said input of said ring counter to said output of said clock gate; and means to connect each one of said ring counter outputs to a different one of said power switches.

18. A power supply as defined in claim 17 wherein said ring counter is provided with a second input and wherein a cold start circuit is connected to said second input of said ring counter to apply said initial battery output voltage to said output terminals.

19. A power supply as defined in claim 5 wherein each of said transistor firing circuits is coupled to a different one of said plurality of said batteries except the battery whose voltage is initially applied to said output terminals.

20. A power supply as defined in claim 19 wherein each one of said firing circuits includes a squib to activate the said battery associated with that firing circuit when that firing circuit is energized.

21. A power supply as defined in claim 20 wherein each of said firing circuits except for the firing circuit associated with the last battery whose output voltage is coupled to said output terminals includes inhibiting means to inhibit the energizing of all of said batteries except for said battery associated with that firing circuit and all previously energized batteries.

22. A power supply as defined in claim 21 wherein said inhibiting means includes a fuse that is burned out when its firing circuit is energized.

* * * * *